June 24, 1958 C. W. MILLER 2,840,758

LIGHT SENSITIVE CONTROL SYSTEM

Filed March 26, 1954

INVENTOR
Charles W. Miller
BY R. E. Fowler
ATTORNEY

United States Patent Office 2,840,758

Patented June 24, 1958

2,840,758

LIGHT SENSITIVE CONTROL SYSTEM

Charles W. Miller, Anderson, Ind., assignor to General Motors Corporation, Detroit, Mich., a corporation of Delaware Application March 26, 1954, Serial No. 418,933

12 Claims. (Cl. 315—83)

This invention relates to light sensitive control systems and more particularly to light sensitive control systems adapted to control the switching means for multi-beam or multi-filament headlamps for automotive vehicles. Current automotive vehicles are provided with headlamps that have two sets of filaments therein, one for long-range high-speed driving, and the other for short-range city driving. These are customarily referred to as the high and low beam filaments. A conventional foot switch is provided, operable by the driver, to alternately switch between these two sets of filaments. There are now on the market automatic switching means for controlling the energization of the different headlamp filaments, which devices are actuated by the amount of light incident on the front of the vehicle from the direction of the roadway ahead.

It is an object in making this invention to provide a novel system for automatically switching the headlamp filaments actuated by incident light.

It is a further object in making this invention to provide a light sensitive switching system for controlling multi-beam headlamps which provides means to maintain low beam illumination in the controlled system, upon a reduction in incident light.

It is a still further object in making this invention to provide a light sensitive control system in which the sensitivity of the system is varied as it actuates between operating positions.

It is a still further object in making this invention to provide a light sensitive switching system for automotive headlamps which provides a time delay to prevent return to high beam illumination upon switching to low beam.

It is a still further object in making this invention to provide a light sensitive switching system for automotive headlamps having a time delay to prevent return to high beam illumination after switching to low beam, which time delay is removed from the circuit upon the intensity of the incident light reaching a predetermined higher level.

It is a still further object in making this invention to provide a light sensitive control switching system for automotive headlamps which varies the bias on the system upon switching and also incorporates time delay means to control a return to the first switch position.

With these and other objects in view which will become apparent as the specification proceeds, my invention will be best understood by reference to the following specification and claims and the illustrations in the accompanying drawings, in which:

In the design of automatic control systems for switching the filaments of headlamps, it is desirable to incorporate certain features in the apparatus. Since the light controlled system switches from high beam to low beam at a predetermined value of incident light on the controlling cell, some means must be provided to maintain the system on low beam energization after initial switching during a certain approach period in the face of a reduction in incident light caused by the operator of the oncoming vehicle, which originally caused the control system to operate, dimming its lights. Another factor which must be considered is that upon the passing of the oncoming vehicle it is desirable to have the headlamps returned to high beam illumination as soon as possible if there are no other approaching cars.

In the present system these two problems of design have been solved by incorporating a change in sensitivity or a time delay or a combination of the two in the control system which maintains the switching means in its actuated position after initial switching to low beam; i. e., it provides a certain period after switching to low beam within which the approaching light, which has been dimmed, will increase in intensity due to approaching closer to the operated car. However, an increase in light to a higher value, such as caused by the oncoming car arriving in proximity to the controlled vehicle and then passing, will operate switching means to remove the time delay portion from the circuit and permit substantially immediate return to high beam illumination even if the timing period has not already expired at any rate.

Figures 1, 2:
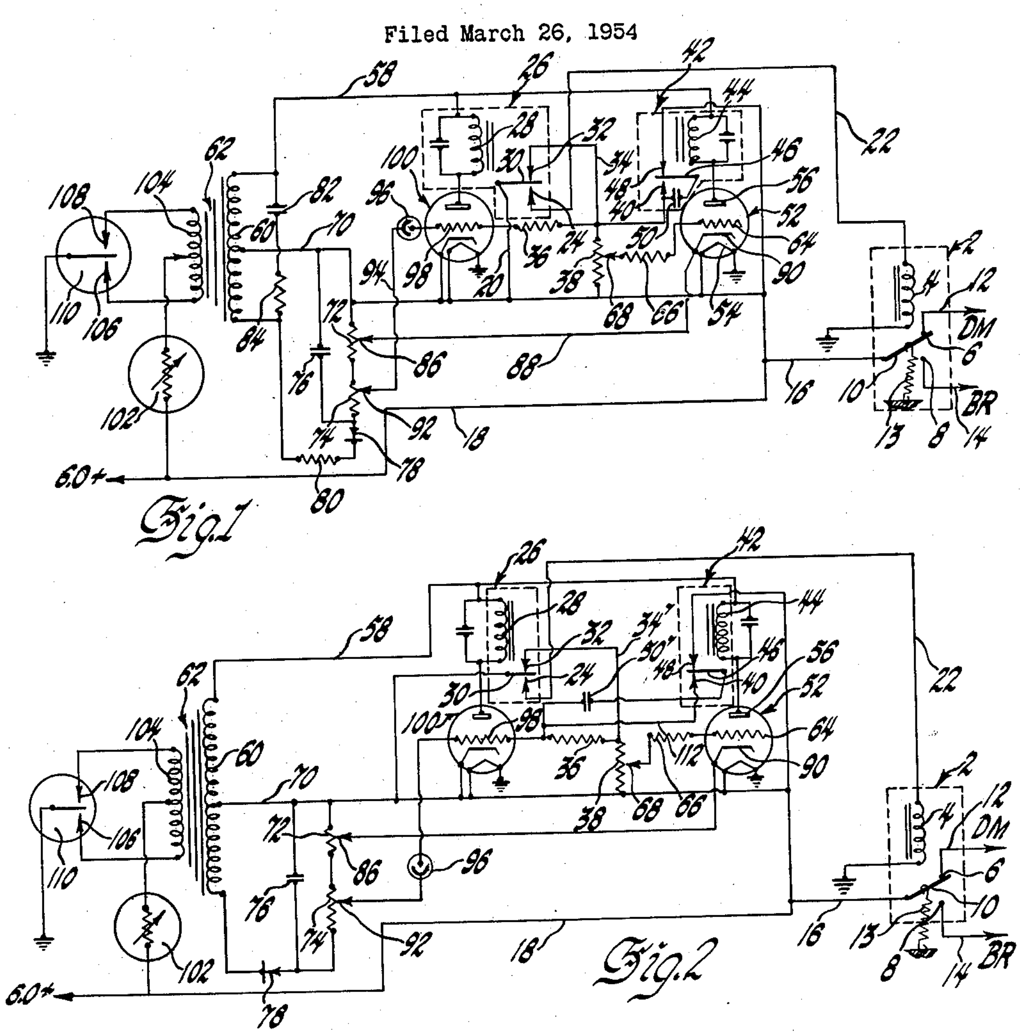
Figure 1 is a circuit diagram of a control system embodying my invention.
Figure 2 is a circuit diagram of a modified form of control system.

Referring now particularly to the control system as shown in Figure 1, there is therein illustrated a main control relay 2 consisting of an operating coil 4 and spaced stationary contacts 6 and 8 between which oscillates a movable armature 10. The armature 10 is spring biased by spring 13 to engage lower stationary contact 8, but can be moved up into engagement with stationary contact 6 upon energization of coil 4. This is the main power relay for controlling the energization of the headlamp beam. Stationary contact 6 is connected through line 12 with the lower beam or dim filaments indicated as DM and the lower stationary contact 8 is connected through line 14 with the high or bright filaments of the headlamps indicated as BR. Thus, when the armature 10 is in upper position and relay coil 4 is energized, the headlamps will be on lower beam or dim, and when the relay coil 4 is deenergized, the high beam or bright filaments will be energized. Armature 10 in order to supply power to these filaments is connected through line 16 with main power supply line 18, which is connected to any conventional source such as the storage battery of an automotive vehicle.

Coil 4 of the relay 2 has one terminal connected to ground and the opposite terminal connected through line 22 to back stationary terminal 24 of relay 26. The relay coil 28 of relay 26 attracts its movable armature 30 to cause the same to move out of engagement with back stationary contact 24 and into engagement with front contact 32 when it is energized. Front contact 32 is connected through line 34 to an intermediate point between two biasing resistors 36 and 38 and further extends to back stationary contact 40 of relay 42. Relay 42 includes an energizing coil 44 which actuates a movable armature 46 between back stationary contact 40 just mentioned and front contact 48, holding it in contact with the latter when the coil is energized. The general purpose of relay 26 is to control the main power relay and the energization of the different filaments of the headlamps and to change the bias on control grid 98 between energized and deenergized positions. The main purpose of relay 42 is to remove from the circuit, time delay means when the incident light reaches a higher level than that necessary to originally dim the headlamp filaments. A timing condenser 50 is connected between armature 46 and line 34 to introduce a certain time delay which will later be more specifically described.

An electron control tube 52 has it filament 54 directly connected to low voltage power line 18 and its plate 56 connected to one terminal of the operating coil 44 of the relay 42. The opposite terminal of the coil 44 is connected through line 58 to one side of the secondary 60 of a power supply transformer 62. The control grid 64 of the tube 52 is connected through resistor 66 to an adjustable tap 68 on the biasing resistance 38. Power line 18 is directly connected to stationary contact 48 of relay 42. Line 70, connected to the center point of the secondary 60 of the transformer 62, extends to power supply line 18, which is considered as ground for certain purposes. This line is also connected to two resistors 72 and 74 in series. A condenser 76 is connected in shunt across the series resistances. The opposite terminal of the last resistor 74 is connected to a rectifier 78, which is in turn connected through resistor 80 to the opposite side of the secondary 60. A capacity 82 in series with a resistor 84 is connected directly across the full secondary 60.

An adjustable tap 86 on resistance 72 is connected through line 88 to the cathode 90 of tube 52. An adjustable tap 92 on resistor 74 is connected through line 94 to a photo-electric or light sensitive cell 96, the opposite terminal of which is connected to control grid 98 of the electron control tube 100. Control grid 98 is also directly connected to one terminal of resistor 36. Supply line 18 is connected to a ballast regulator tube 102 which is in turn connected to the center point of the primary winding 104 of the supply transformer 62. The two outer terminals of the primary winding 104 are connected to stationary contacts 106 and 108 respectively of a vibrator 110 to alternately supply power to the primary 104. Regulated power is, therefore, supplied to the plate circuits through the vibrator power pack.

In the type of system shown in Figure 1 the bias on the amplifying tube 100 that controls sensitive relay 26 is varied between switch positions of armature 30. When the relay is energized and armature 30 is in the upper position as shown, the bias on grid 98 is determined by resistor 36 only while the bias in the opposite armature position is determined by resistors 36 and 38 in series, making the tube much more sensitive and a smaller amount of light is necessary to control the relay. In combination with a bias change when switching from high to low beam, this system also inserts a time delay portion which includes condenser 50, which tends to maintain the bias on control grid 98 at the time of switching for a time period determined by the values of the condenser 50 and resistor 38. Thus both by making the amplifier tube 100 more sensitive and inserting a time delay period, the system tends to prevent a return to high beam illumination upon a reduction in oncoming light due to the approaching driver dimming his lights.

Under normal operating conditions and assuming that the operator is driving in the country with no light incident on the photo-sensitive cell 96, the various potentiometers 68—38, 86—72 and 92—74 are so regulated that both tubes 100 and 52 conduct a sufficient amount of current to cause relay coils 28 and 44 to attract their armatures 30 and 46, respectively, and maintain them in the position shown. This, therefore, opens the circuit to the power relay coil 4 and spring 13 holds armature 10 in its lower position, completing an obvious circuit to the high or bright filaments of the headlamps. Assuming that a car approaches, light begins to fall on cell 96, whose resistance changes to such a degree as to change the potential on grid 98, reducing the conductance through the tube 100, and causing relay coil 28 to drop its armature 30 at a certain light intensity. The armature 30 breaks contact with stationary contact 32 and completes contact with stationary contact 24.

This completes an energizing circuit for the power relay 2 as follows: power line 18, line 20, armature 30, back contact 24 of relay 26, line 22, and coil 4 to ground. The power relay 2 is energized and armature 10 is moved away from stationary contact 8 and into engagement with stationary contact 6 to break the energizing circuit to the high filaments and complete that to the low or dim filaments. Thus the lights are switched to low beam.

Prior to switching it is to be noted that the common connection between resistor 36 and capacitor 50 was connected to low voltage line 18 through contact 32 and armature 30 of the relay 26. As soon, however, as this relay is deenergized, causing armature 30 to drop, then the resistance in the circuit of grid 98 is immediately increased to resistor 38 plus resistor 36 to vary the bias, and at the same time condenser 50 is placed in the grid resistance network across resistance 38 to line 18. The insertion of additional grid resistance assures a lower grid voltage to reduce tube conductance so that lesser light will not cause the relay coil 28 to again be energized and condenser 50 provides a time delay in voltage change.

As the approaching car comes closer and closer and the amount of light incident on the cell 96 still further increases, the voltage applied to control grid 64 through tap 68 will decrease to a point where tube 52 will cut off, causing relay coil 44 to be deenergized and drop its relay armature 46, which immediately short circuits condenser 50 and takes it out of the grid resistance network to remove any time delay action. Thus at the instant the cars pass both relay coils 28 and 44 are deenergized and no time delay means is incorporated in the grid circuit so that, with the removal of light on the cell 96, the coils 28 and 44 will immediately become renergized to cause the lights to switch back to high beam. The different levels of light intensity at which the system switches to low and returns to high beam illumination may be adjusted by changing taps 86, 68 and 92.

The circuit shown in Figure 2 does not differ greatly from that shown in Figure 1 and the same reference characters will be applied to the similar parts of the two circuits. The resistor 80 has been removed from the connection between rectifier 78 and one terminal of the secondary 60 of the power supply transformer and the series connection of condenser 82 and resistor 84 eliminated across the secondary 60. The time delay means including condenser 50′ in this instance has been varied. Front contact 32 of the relay 26 is still connected through line 34′ to a point intermediate the two resistors 36 and 38, but that point is not connected with back contact 40 of relay 42. Instead contact 40 is directly connected through line 112 to the control grid 98 of the tube 100. Control grid 98, as before, is directly connected to the photo-electric cell 96. Armature 46 of relay 42 is directly connected through timing condenser 50′ with the control grid 98, shunting both resistors 36 and 38 when in circuit.

Otherwise the operation of Figure 2 as far as the dimming and control cycle is concerned, is the same as Figure 1, tubes 100 and 52 being conductive when no light falls on the photocell, and in this condition the power relay 2 is deenergized and the headlamps are on high beam. Upon the receipt of sufficient light to switch to low beam, grid 98 is driven in a negative direction sufficiently to cause coil 28 to drop its armature 30, completing an energizing circuit for the power relay and inserting the resistance 38 and the condenser 50′ into the grid circuit of the tube 100 to prevent return to high beam illumination upon a reduction in light by changing the bias and simultaneously introducing some time delay. When the incident light has increased to a further desired degree, then tube 52 is cut off by grid 64 being driven sufficiently negative to drop armature 46, removing condenser 50′ from the circuit and thus removing any time delay to permit the system to return immediately to high beam illumination upon the passage of cars and the removal of incident light.

Figure 3:
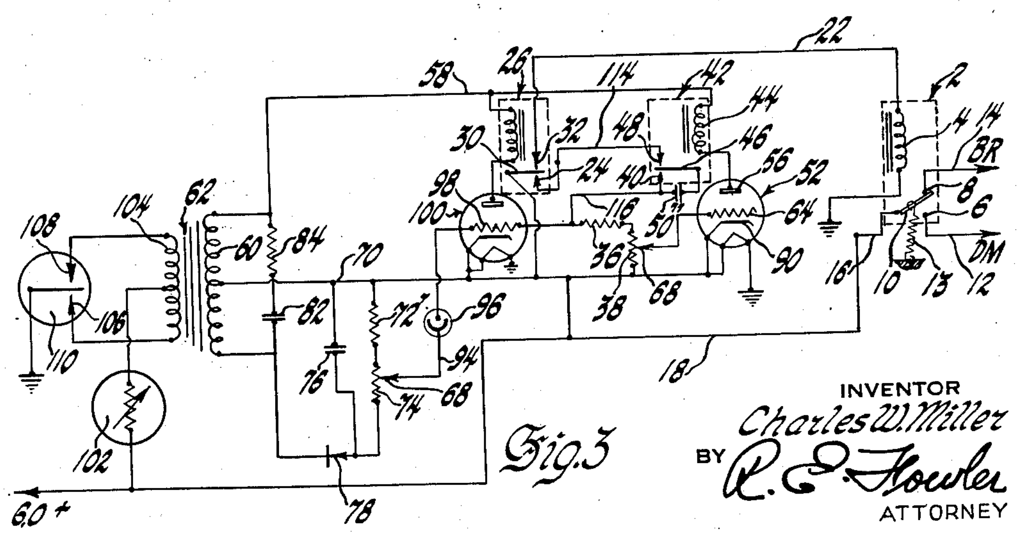
Figure 3 is a circuit diagram of a further modified form of a control system embodying my invention.

Figure 3 shows a further modified form of construction. In this form there is no change in bias caused by switching resistors. Only time delay is used to prevent return to high beam. In Figure 3 back contact 24 of relay 26 is connected through line 114 to front contact 48 of relay 42. As previously shown in Figure 1, armature 46 of relay 42 is directly connected through condenser 50″ to back contact 40 of the same relay, but the two are then connected directly through line 116 to the control grid 98 of tube 100. The power supply and connections are the same as Figure 1 except that cathode 90 of tube 52 is directly connected to line 70.

The movement, therefore, of armature 30 to its back contact 24 when the lights switch to dim completes a circuit through condenser 50″ in shunt to resistors 36 and 38 in the grid resistance circuit to provide the desired time delay and, as before, condenser 50″ is removed from the circuit when tube 52 cuts off and deenergizes relay coil 44. In this version power line 18 is connected to line 70 through interconnecting line 118.

The operation of the system shown in Figure 3 is, therefore, that when the lights have switched to low beam they will stay in that position for a definite time period determined by the values of the resistances 36 and 38 and condenser 50″. Following this period the lights will switch back to high unless the incident light is at least as strong as it was to drive the tube 100 non-conductive in the first instance. There is no changing of bias on tube 100 between switch positions in this form. The form shown in Figure 3 does remove the time delay action from the circuit upon a surge of light beyond that necessary to cause the system to switch to low beam the same as in Figures 1 and 2.

I claim:

1. In a light controlled system, a source of electrical power, switching means connected to said source and to apparatus to be controlled, relay coil means for operating said switching means, a second relay switching means connected to the relay coil to control the energization thereof, light sensitive means connected to the source of power and to the second relay switching means to control the same dependent upon light falling thereon, time delay means connected to the light sensitive means to maintain the second relay switching means in a position to which it has been actuated for a given time and further light controlled switching means connected to the time delay means to render it ineffective upon a further increase in light.

2. In a light controlled system, a source of power, relay switching means connected to the source and to apparatus to be controlled, a light sensitive cell, electronic amplifying means connected to said cell and to the relay switching means to control the latter, time delay means connected to the amplifying means to maintain the relay switching means in actuated position, and additional light controlled switching means connected to said cell and to the time delay means to remove the time delay means from circuit upon a further increase in light.

3. In a light controlled system for controlling the energization of vehicle headlamps having high and low beam filaments, a source of power, switching means connected to the source and to the filaments to alternately energize the high and low filaments, relay coil means operatively connected to said switching means to actuate the same, light sensitive means connected to the source of power, amplifying means connected to the light sensitive means and having a control grid, biasing means connected to said grid, a second switching means connected to said biasing means and to the relay coil to control the same, a second relay coil connected to the amplifying means operatively associated with said second switching means, a third switching means connected to said biasing means and the source of power, second amplifying means connected to the light sensitive means and controlled thereby actuating said third switching means to change the effect of the bias at a given intensity of light.

4. In a light controlled system, switching means, operating means for the switching means, a source of electrical power connected to said switching means, a light sensitive cell connected to the source of power, amplifier means connected to the cell and having biasing means, controlling means connected in the output of the amplifier means, to the biasing means and to the operating means to change the bias and control the operating means, dependent upon the amount of light falling on said cell, time delay means connectable to the biasing means and the source of power, and further light actuated switching control means connected to the light sensitive means controlling the connection of the time delay means to the biasing means at a predetermined light level to modify the action thereof.

5. In a light sensitive control system, a source of electrical power, a relay switching means for controlling desired apparatus, a light sensitive means connected to the source of power, a plurality of amplifier means connected to the source and to the light sensitive means and biased to conduct at different levels of light impinging on the light sensitive means, a plurality of switching means connected in the output circuits of the amplifiers and to the biasing means for one of the amplifiers and to the relay switching means to control the latter and vary the biasing of the one amplifier at different light levels.

6. In a light sensitive control system, a source of electrical power, a relay switching means for controlling desired apparatus, a light sensitive means connected to the source of power, a plurality of amplifier means connected to the source and to the light sensitive means and biased to conduct at different levels of light impinging on the light sensitive means, a second relay switching means connected in the output of the first amplifier and to the biasing means and to the first relay switching means to control the same and simultaneously change the bias, a third relay switching means in the output of the second amplifier and connected to the biasing means, a condenser included in the connection between the third relay switching means and biasing means to provide a time delay circuit connected to the biasing means which is removed from the circuit when the second amplifier conducts at a different light level.

7. In a light sensitive control circuit, a source of electrical power, a light sensitive cell connected thereto, a pair of amplifier circuits connected in parallel and to the cell, biasing means for the amplifiers connected to the amplifiers conditioning them to conduct at different intensities of incident light, a first relay switching means in the output of the first amplifier circuit connected to the biasing means and to the source of power to vary the bias, a condenser connected to the biasing means, and second relay switching means connected in the output circuit of the second amplifier circuit and to the condenser to switch it into active connection or remove the same.

8. In a light sensitive control circuit, a source of electrical power, a light sensitive cell connected thereto, a pair of amplifier circuits connected in parallel and to the cell, biasing means for the amplifiers connected to the amplifiers conditioning them to conduct at different intensities of incident light, a first relay switching means in the output of the first amplifier circuit connected to the biasing means and to the source of power to vary the bias, time delay means connected to the biasing means and second relay switching means connected in the output of the second amplifier and to the time delay means to effectively connect the time delay means thereto.

9. In a light controlled system, the combination comprising, a source of power, a light sensitive cell connected to the source, amplifier means connected to the cell, biasing means connected to said amplifier, a time constant circuit connected to said biasing means, and relay switching means connected in the output of the amplifier means and to the biasing means to vary the bias and introduce a time delay upon movement to one position and light controlled switching means connected to the light sensitive cell and to the time constant circuit to render said time constant circuit ineffective at a given level of light intensity.

10. In a light controlled system, the combination comprising a source of power, a light sensitive cell connected to the source, amplifier means connected to the cell, biasing means connected to said amplifier, a time constant circuit connected to said biasing means, relay switching means connected in the output of the amplifier means and to the biasing means to vary the bias and introduce a time delay upon movement to one position, and additional relay switching means connected to the amplifier means and independently actuated by the light controlled output thereof and also connected to the time constant means to render the time constant means ineffective at a different level of light intensity from that which causes actuation of the first-named relay switching means.

11. In a light actuated control system, lamp filaments it is desired to control, a source of power, relay switching means connected to the source of power for controlling the filaments, a light sensitive cell connected to said source, an amplifier having a grid and anode, said relay switching means being connected between said anode and the source of power, said cell being connected to said grid, biasing means connected to said grid and source of power, a shunt circuit connected across a part of said biasing means, switching means in said shunt circuit forming a part of said relay switching means, and a condenser connected between the source and biasing means in parallel to said shunt circuit to provide a time constant circuit therewith so that when the relay switching means is operated the grid bias is changed and simultaneously a time delay is introduced to the grid voltage variation.

12. In a light actuated control system, lamp filaments it is desired to control, a source of power, relay switching means connected to the source of power for controlling the filaments, a light sensitive cell connected to said source, an amplifier having a grid and anode, said relay switching means being connected between said anode and the source of power, said cell being connected to said grid, biasing means connected to said grid and source of power, a condenser connected to said biasing means, switching means connected between the condenser and source of power, and means for operating the switching means at a given level of light intensity connected to the cell to remove the condenser from the biasing circuit when light reaches a given level.

References Cited in the file of this patent

UNITED STATES PATENTS

| | | |
|---|---|---|
| 2,476,389 | Schmidt | July 19, 1949 |
| 2,560,748 | Silva | July 17, 1951 |

OTHER REFERENCES

Marley, "Automatic Headlight Dimmer," Radio-Electronics, vol. 24, No. 10, October 1953.